United States Patent [19]

Barker et al.

[11] Patent Number: 4,487,216
[45] Date of Patent: Dec. 11, 1984

[54] VALVE SEAL FOR FIRE SAFE OR HIGH TEMPERATURE VALVES

[75] Inventors: James E. Barker, Sauk Rapids; James C. Hadley, Sartell, both of Minn.

[73] Assignee: General Signal Corporation, Stamford, Conn.

[21] Appl. No.: 406,346

[22] Filed: Aug. 9, 1982

[51] Int. Cl.³ .............................................. F16K 1/228
[52] U.S. Cl. ................................... 137/74; 251/173; 251/306
[58] Field of Search ................... 251/306, 173; 137/72, 137/74; 277/236

[56] References Cited

U.S. PATENT DOCUMENTS

| | | |
|---|---|---|
| 2,942,840 | 6/1960 | Clade . |
| 3,077,902 | 2/1963 | Vickery . |
| 3,394,915 | 7/1968 | Gachot . |
| 3,734,457 | 5/1973 | Roos . |
| 4,113,268 | 9/1978 | Simmons et al. . |
| 4,194,749 | 3/1980 | Bonafous ........................... 251/306 |
| 4,201,239 | 5/1980 | Kawamura . |
| 4,202,365 | 5/1980 | Aoki et al. . |
| 4,220,172 | 9/1980 | Stager . |
| 4,231,546 | 11/1980 | Eggleston et al. . |
| 4,241,895 | 11/1980 | Sternenberg et al. . |
| 4,271,858 | 6/1981 | Snape . |
| 4,272,054 | 6/1981 | Zinnai . |
| 4,293,116 | 10/1981 | Hinrichs ............................ 251/306 |
| 4,410,163 | 10/1983 | Scobie et al. ....................... 251/306 |

*Primary Examiner*—Martin P. Schwadron
*Assistant Examiner*—Mark Malkin
*Attorney, Agent, or Firm*—Barnes & Thornburg

[57] ABSTRACT

Disclosed is a flexible sealing ring for a valve having a generally S-shaped cross-section and an extension from one end of that S-shape. The extension is mounted on the valve body and serves as a cantilever means for the sealing ring which is thus sealingly engagable with the peripheral sealing surface of a movable valve member pivotally positioned within the valve passageway. The sealing ring is formed from materials capable of withstanding high temperatures (1000° F.) for sustained periods without impairment of its' sealing capacity. The sealing ring may be used in cooperative combination with other sealing rings, including heat destructible materials such as "Teflon", to form valve seal means effective over a range of temperatures and pressures, including firesafe valve seal means.

19 Claims, 7 Drawing Figures

VALVE SEAL FOR FIRE SAFE OR HIGH TEMPERATURE VALVES

BACKGROUND OF THE INVENTION

The present invention relates generally to sealing devices for valves, particularly high pressure and high temperature seals for valves having a pivotal closure member, such as butterfly or ball valves. More specifically, the present invention relates to valve sealing devices having high temperature destructible and undestructible seals.

Valves for use in systems transporting combustible fluids, such as petroleum or other hydrocarbons, or in systems where fluids are transported through inflammable environments, must provide effective sealing at normal temperatures and pressures as well as at elevated temperatures and pressures, resulting because of a fire in the vicinity of the transport system, in order to prevent fluid leakage. Prior art devices, such as that disclosed in U.S. Pat. No. 3,734,457, to Roos, have employed high pressure and temperature resistant materials, such as "Teflon" in valve seats, but these materials are not suited for sustained sealing at fire temperatures (over 750° F.). Prior art devices have also employed sealing devices containing metallic sealing rings, for use at fire temperatures and pressures, in combination with heat destructible resinous, polymeric, or elastomeric sealing rings, for use at lower or moderate temperatures and pressures (often only up to 250°0 F. and 300 psi). While these dual seal devices have generally performed satisfactorily, they are often very costly and difficult to assemble or replace due to the unique component configurations employed. Also, when a fire destroys the low temperature sealing ring, debris from that ring sometimes flows through the valve or remains in the vicinity of the high temperature sealing ring in such a way as to interfere with the proper sealing of the remaining sealing ring and, thus, creates leakages of fluid which may cause the fire to spread.

Similar problems have been encountered in providing effective valve seals for fluids transported through, or themselves maintained at, high temperatures (approximately 1000° F.). Prior art devices have usually consisted of metal sealing rings which may be spring or pressure biased against the movable valve member. Again, these sealing devices have usually been costly to produce and difficult to install in the valve. Less expensive devices typically are incapable of effective sustained operation at high temperatures as they may become unseated and/or deformed.

SUMMARY OF THE INVENTION

An object of the invention is to provide an improved valve seat capable of sustained use at high temperatures.

Another object of the present invention is to provide an improved flexible sealing ring for a valve which may be constructed of thinner or less expensive materials and yet be capable of sustained fluid sealing at various temperatures and pressures.

A further object of the present invention is to provide a valve sealing ring, cantilevered from the valve body and sealingly engagable with movable valving elements, having a generally S-shaped cross-section.

A still further object of the present invention is to provide an improved flexible sealing ring for a valve which may be used in close cooperation with various other valve sealing rings so as to permit effective and efficient seal means for the valve over a range of different operating temperatures and pressures.

These and other objects of the present invention are attained by providing a flexible sealing ring constructed of metal or other materials capable of sustained sealing at high temperatures (1000° F.). This sealing ring has a generally S-shaped cross-section and an extension from one end of the S-shape which is mounted on the valve body, thus providing the sealing ring with a centilever means. The end of the S-shape opposite this extension is sealingly engagable by the peripheral sealing surface of a movable valve member, pivotally positioned in the passageway of the valve, when that movable valve member is in its closed position. This sealing ring may be employed alone or in a cooperating combination with other sealing rings having different configurations and temperature sustaining characteristics so as to permit optimum valve sealing over a range of different temperatures and pressures. In particular, when combined with a "Teflon" or heat destructible sealing ring, this sealing ring provides an effective firesafe sealing ring means.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
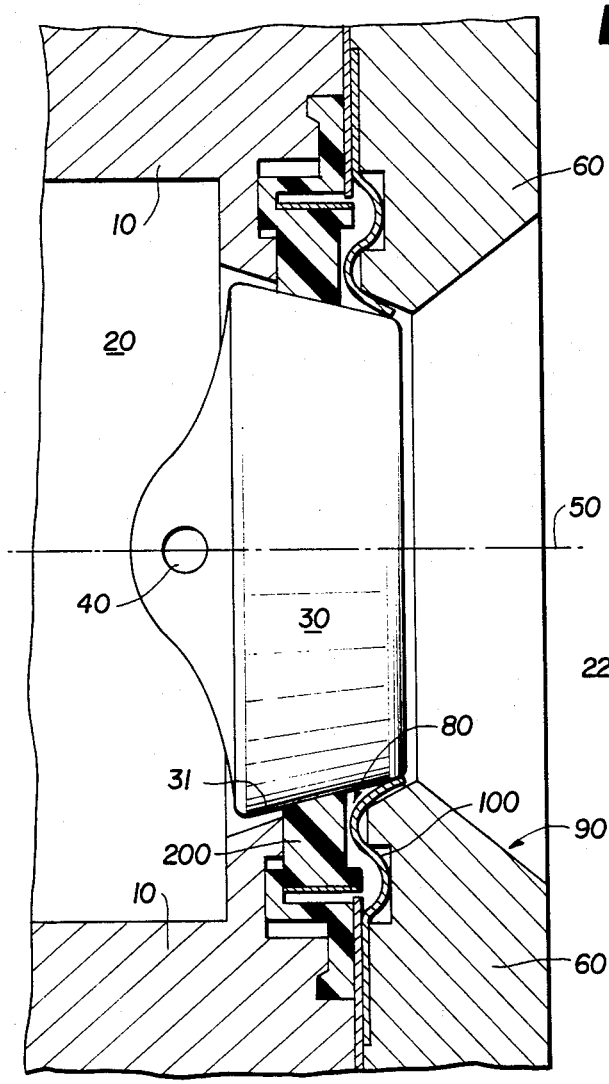
FIG. 1 is a sectional view of a butterfly valve embodying an improved firesafe sealing means of the present invention.

Referring now to the drawings, wherein like reference numerals designate like or corresponding parts throughout all the figures, FIG. 1 shows a butterfly valve assembly which employs an embodiment of the present invention in a firesafe seal means. Valve body 10 contains an axial flow passage 20 suitable for conducting or transporting fluid material therethrough. Valving action to control fluid flow through passageway 20 is controlled by movable valve member 30 which pivots from open to closed positions with shaft 40 within cylindrical passageway 20 having axis 50. Shaft 40 is connected to exterior control means (not shown in Figures) such that rotation of shaft 40 opens and closes movable valve member 30 having peripheral valve sealing surfaces 31 thereon. The use of a butterfly valve assembly with the present invention is shown only by way of example; any valving member, including a ball valve, which is retained within passageway 20 and is pivotal about an axis transverse to central passageway axis 50 between an open a closed fluid passage position may be so employed.

Figure 2:
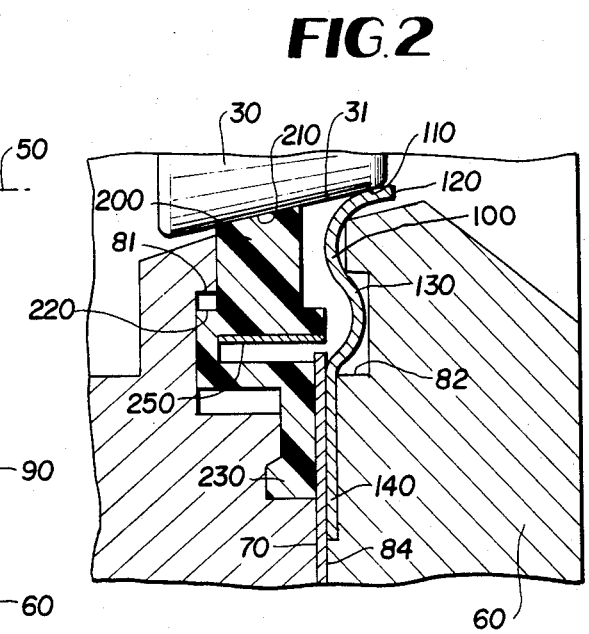
FIG. 2 is an enlarged fragmentary sectional view of the improved firesafe sealing means of the present invention shown in FIG. 1.

A firesafe sealing means utilizing the present invention is shown generally at 90 in FIG. 1 and is illustrated in detail in FIG. 2. Annular groove means 80 is disposed in passageway 20 in radial alignment with peripheral valve sealing surface 31 of movable valve member 30 when movable valve member 30 is in a closed position. Groove means 80 is formed of a recess between valve body 10 and retainer means 60. Groove means 80 is provided with axially extending groove shoulder means 81 radially inward from first groove portion or cavity 82. First groove portion or cavity 82 is likewise radially inward from second groove portion or cavity 83. Radial extension 85 of groove means 80 extends radially outward from second groove portion 83. The purposes of these features will be hereinafter detailed.

Both sealing rings 100 and 200 project radially inward from annular groove means 80 such that sealing ring surfaces 110 and 210 of sealing rings 100 and 200, respectively, are engagable by peripheral valve sealing surface 31 to provide a fluid flow seal means when movable valve member 30 is in a closed position. Sealing ring surfaces 110 and 210 may be engagable with peripheral valve sealing surface concurrently or alternatively, such that sealing ring surface 210 engages at normal temperatures and sealing ring surface 110 engages at high temperatures.

Heat indestructible flexible sealing ring 100 is formed so as to have an S-shaped cross-sectional region 130 with an extension 140 from that region. Extension 140 is secured between a retaining means 60 and valve body 10 within radial extension 85 of groove means 80. Thus, extension 140 is the means by which flexible sealing ring 100 is retained within groove 80. Due to unique S-shaped region 130 and the mounting of extension 140 on valve body 10, flexible sealing ring 100 extends cantilevered through groove means 80 into passageway 90.

Heat destructible sealing ring 200, as employed in this particular embodiment of the present invention, may be formed advantageously similarly to the sealing ring disclosed in U.S. Pat. No. 3,734,457 to Roos. As the present invention does not seek to claim that sealing ring except in combination with unique flexible sealing ring 100, only a brief description of such a resilient sealing ring 200 follows herein.

Resilient sealing ring 200 is formed with axially extending shoulder means 220 engagable with axially extending groove shoulder means 81 to ensure retention of resilient sealing ring 200 within groove means 80. An additional retaining means for resilient sealing ring 200 is circumferential web means 230, formed on its' radially outer periphery and fitted within complementarily formed second groove portion 83 with the outer portion of web means 230 being axially wider than the inner portion thereof. This web width differential also serves to hold resilient sealing ring 200 firmly in place.

Metal hoop means 250 engages at least a portion of the lower side of shoulder means 220 about its' circumference to take up the primary stresses imparted to resilient sealing ring 200 by movable valve member 30 upon closure. This provides for a minimizing of cold flow of resilient sealing ring 200 and prolongs the useful life of that seal.

It has been found particularly advantageous to make heat destructible resilient sealing ring 200 from polytetrafluoroethylene (TFE), commonly known as "Teflon". This material is chemically inert to a wide range of fluid compositions and is thermally stable at temperatures up to 500° F. It is also resilient and has a very low frictional coefficient. As used herein, "normal" or "lower" temperatures shall mean temperatures in the range of 0° F. to approximately 500° F., as defined more specifically by the thermally stable temperature range of the materials from which resilient sealing ring 200 is made.

It has been found particularly advantageous to make heat indestructible flexible sealing ring 100 from a metal. A large variety of suitable alloys are available; the primary required characteristics are the ability to withstand high temperatures (750° F.–1600° F.) for sustained periods of time and resistance to the corrosive effects of the particular fluid transported.

Heat resistant gasket means 70 is provided and compressed between valve body 10 and retaining means 60 to prevent fluid leakage between flexible sealing ring 100 and retaining means 60. Gasket means 70 also provides a fluid seal between valve body 10 and retainer means 60, as shown at location 84. Gasket means 70 may be advantageously formed from a graphite material capable of sustained use at high temperatures.

Figure 3:
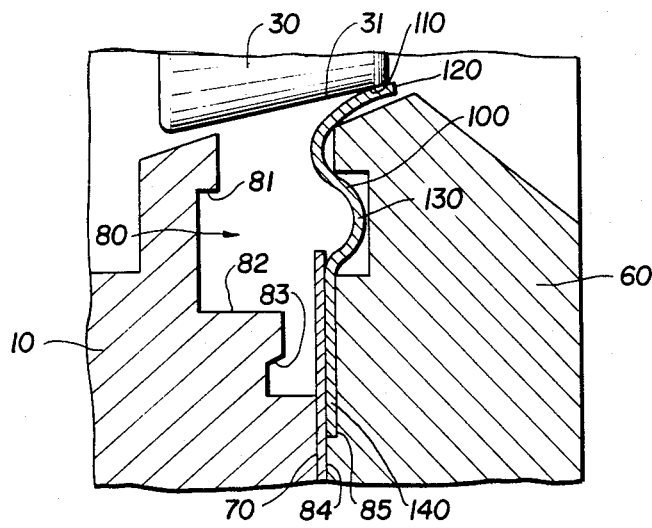
FIG. 3 is an enlarged fragmentary sectional view, similar to FIG. 2, of the improved firesafe sealing means of the present invention shown after fire or high temperature has destroyed the heat destructible sealing ring.

As operably employed in a firesafe sealing means 90, resilient sealing means 200 prevents fluid flow past movable valve member 30 in both directions of fluid flow under pressure trough passageway 20 during normal operating temperatures. Resilient sealing ring 200 may be destroyed partially or completely during a fire. Flexible sealing ring 100 will then effectively provide sealing against fluid under pressure from the same side of movable valve member 30 as retainer means 60 since lip portion 120, under fluid pressure, forces sealing ring surface 110 against peripheral sealing surface 31 of movable valve member 30, as illustrated in FIG. 3. The unique cantilevered S-shaped cross-section of flexible sealing ring 100 assists in maintaining contact between sealing surface 31 and sealing ring surface 110 regardless of whether resilient seal 200 is partially or completely destroyed by fire, and wear on sealing surface 110 is thus kept to a minimum.

Figure 4:
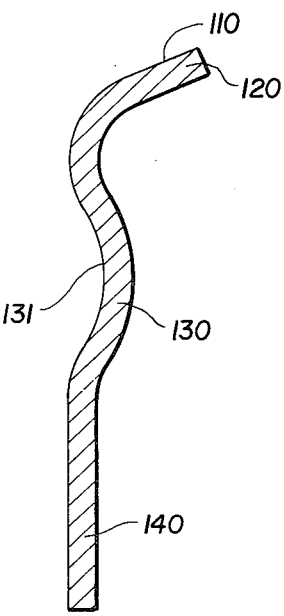
FIG. 4 is an enlarged fragmentary sectional view of the heat indestructible sealing ring.
Figure 5:
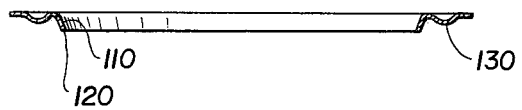
FIG. 5 a cross-sectional view of the heat indestructible sealing ring.
Figure 6:
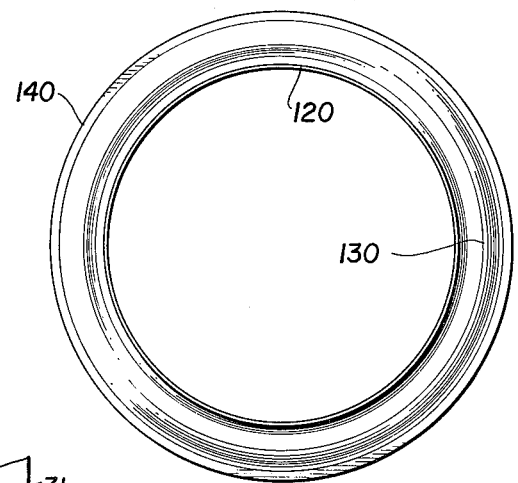
FIG. 6 is a plan view of the heat indestructible sealing ring.

Flexible sealing ring 100 is illustrated in FIGS. 4–6. The unique S-shape cross-section stiffens the seal in the direction of axis 50 and allows the use of thinner and less costly material than would be required for other seals, especially flat seals with only a lip for sealing valve contact. This S-shape permits radial movement of sealing ring surface 110 relative to fixed extension 140. The S-shape also helps flexible sealing ring 100 resist excessive permanent deformation at high pressures. By extending lip portion 120 to various lengths, various degrees of fluid pressure sensitivity may be obtained as may be desired for the sealing means in a particular valve structure. An advantage of this design of flexible sealing ring 100 is that, within a few operating cycles, the ring will permanently deform to conform to the shape of sealing surface 31. Also, since sealing ring 100 is flexible, it will remain in contact with sealing surface 31 as valve member 30 is moved downstream in response to different fluid pressures in passageway 20.

Flexible sealing means 100 may be employed in a valve alone, in which case it will operate similarly to firesafe sealing means 90 after a fire, as described above and illustrated in FIG. 3, or it may be used cooperatively with various other sealing means so as to achieve optimum sealing for a particular valve means over a range of temperatures and pressures.

Figure 7:
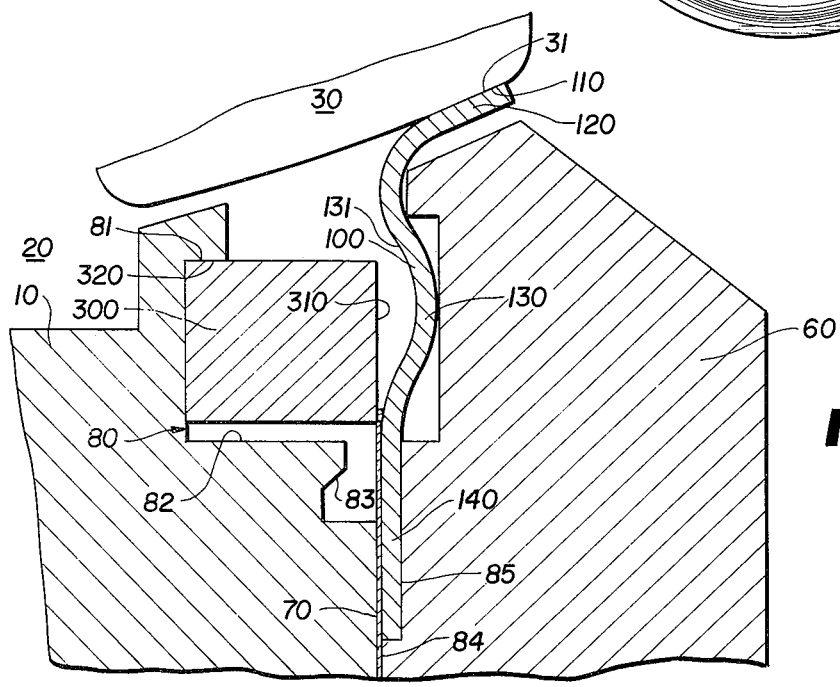
FIG. 7 is an enlarged fragmentary sectional view similar to FIG. 2 of another embodiment of the present invention.

As illustrated in FIG. 7, flexible sealing means 100 may be employed with support ring 300, also disposed in groove means 80, to provide a further improved means for continuous sealing operation at high temperatures. Side surface 310 of support ring 300 is engagable with side surface 131 of flexible sealing ring 100 adjacent S-shaped cross-section 130. Support ring 300 is provided with axially extending shoulder means 320 within groove means 80. High temperature sealing may be achieved in the same manner as post-fire one directional sealing in firesafe sealing means 90.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of this invention are limited only by the terms of the appended claims.

What is claimed is:

1. A valve assembly operative for controlling fluid flow through a passageway in the valve body, the combination comprising:
    a movable valve member adapted to close said passageway and having a peripheral sealing surface;
    annular groove means disposed about said passageway in said valve body in radial alignment with said peripheral sealing surface of said movable valve member;
    a flexible sealing ring secured to said valve body and extending from said groove means into said passageway to sealingly engage said peripheral sealing surface of said movable valve member when said valve member is in it's closed position; and
    said flexible sealing ring having a portion thereof with a curvilinear S-shaped cross-section and an extension extending from one end of the S-shape, said extension being mounted to said valve body such that the S-shaped portion extends cantilevered through said groove and into said passageway.

2. The valve assembly according to claim 1, wherein a support ring is retained within said groove means and engagable with one side of said flexible sealing ring, and said flexible sealing ring is formed from material capable of withstanding high temperatures without significant impairment of its' sealing capacity.

3. The valve assembly according to claim 2, wherein said support ring and said flexible sealing ring are made from metal, and said support ring continuously engages said flexible sealing ring so as to enable said flexible sealing ring to provide a fluid flow seal when said flexible sealing ring is engaged with said movable valve member.

4. The valve assembly according to claim 2, wherein said flexible sealing ring is provided with a radially inward lip portion opposite the retained extension from said S-shaped cross-section and which provides a sealing surface engagable by the peripheral sealing surface of said movable valve member.

5. The valve structure according to claim 4, wherein said groove means is comprised of a recess formed in said valve body and a retainer means attached to said valve body in a manner to oppose said recess therein, and said retained extension from said S-shaped cross-section of said flexible sealing ring is retained within said groove means between said retainer means and said valve body at a location radially outward from said recess.

6. The valve structure according to claim 5, wherein a heat resistant gasket means for preventing fluid leakage between said flexible sealing ring and said retainer means and between said valve body and said retainer means is provided between said retainer means and said valve body, and all elements of said valve structure are made from materials capable of sustained use at 1000° F. and high fluid pressures.

7. The valve structure according to claim 1, wherein said groove means is provided with axially extending shoulder means and a radially inner first portion substantially wider than a radially outer second portion thereof.

8. The valve structure according to claim 7, wherein a second resilient sealing ring is also disposed in said groove means such that, upon closure of said movable valve member, said second resilient sealing ring sealingly engages said peripheral sealing surface of said movable valve member, and said second resilient sealing ring has a primary sealing surface formed on the radially innermost periphery thereof, axially extending shoulder means engagable with said axially extending shoulder means within said groove means to retain said second resilient sealing ring within said groove means, and circumferential web means extending substantially radially outwardly from said axially extending shoulder means and into the radially outer second portion of said groove means.

9. The valve structure according to claim 8, wherein said second resilient sealing ring is engagable by said movable valve member to provide for a fluid flow seal in both directions of fluid flow through said passageway at normal operating temperatures, and said flexible sealing ring having a cantilevered S-shaped cross-section is engagable by said movable valve member to provide a fluid flow seal in one direction of fluid flow through said passageway at high operating temperatures which render said second resilient sealing ring inoperable.

10. In a valve having a valve body, a passageway through said valve body, a valving member retained within said passageway and pivotal about an axis transverse to said passageway between an open and a closed position for interrupting fluid flows through said valve in said passageway over a range of different pressures and temperatures across said valve, and a firesafe sealing means for providing a fluid seal between said valving member and said passageway interior surface at normal temperatures and high temperatures, the improvement comprising, in said firesafe sealing means, the combination of:
    annular groove means in said passageway disposed in radial alignment with the peripheral sealing surface of said valving member when that valving member is in a closed position;
    a first resilient sealing ring, disposed in said groove means and projecting radially inwardly therefrom into said passageway, having a primary sealing surface formed on the inner periphery thereof engagable by the peripheral sealing surface of said valving member; and
    a second flexible sealing ring, also disposed in said groove means and projecting radially inwardly therefrom into said passageway, having a cross-sectional configuration including a curvilinear S- shaped cross-section region and an extension from said S-shaped cross-section, said extension retained within said groove means so as to provide cantilever means for said second flexible sealing ring.

11. The valve structure according to claim 10, wherein said annular groove means has a radially inner first portion substantially wider than a radially outer second portion thereof.

12. The valve structure according to claim 11, wherein said first resilient sealing ring forms an axially extending shoulder means a circumferential web extending substantially radially outwardly from said axially extending shoulder means and into the radially outer second portion of said groove means, said peripheral sealing surface of said valving member being in the form of a circular sector in axial cross-section with the radius of said sector decreasing from the axial center of said sealing surface to the edges thereof so as to provide for a noninterfering lead-in to said primary sealing surface on the inner periphery of said sealing ring.

13. The valve structure according to claim 12, wherein a metal hoop means is located on and engaging at least a portion of said shoulder means, said hoop means and sealing ring being dimensioned relative to each other and relative to the valving member so as to be circumferentially stretched when the primary sealing surface of the sealing ring is substantially completely engaged by the peripheral sealing surface of the valving member and such that said hoop means returns said sealing ring to a substantially unstretched condition when the primary sealing surface thereof is not substantially completely engaged by the peripheral sealing surface of the valving member.

14. The valve structure according to claim 10, wherein said first resilient sealing ring is engagable by said valving member to provide a fluid flow seal in both directions of fluid flow through said passageway at normal operating temperatures, and said second flexible sealing ring is engagable by said valving member to provide a fluid flow seal in one direction of fluid flow through said passageway at high operating temperatures which destroy said first resilient sealing ring.

15. The valve structure according to claim 11, wherein said annular groove means is comprised of an annular recess formed in said valve body and an annular retainer attached to said valve body in a manner to oppose said annular recess therein.

16. The valve structure according to claim 15, wherein said extension from said S-shaped cross-section of said second flexible sealing ring is retained within said groove means between said annular retainer and said valve body at a location radially outward from said radially outer second portion, and a heat resistant gasket means for preventing fluid leakage betwen said second flexible sealing ring and said annular retainer is provided between said annular retainer and said valve body.

17. The valve structure according to claim 16, wherein said first resilient sealing ring is made of a fluorinated hydrocarbon polymer principally comprised of polymerized tetrafluoroethylene, said second flexible sealing ring is made of metal, and said heat resistant gasket means is made of graphite.

18. The valve structure according to claim 16, wherein a radially inward second extension is formed on said second flexible sealing ring such that it is opposite the retained extension of said S-shaped cross-section and provides a peripheral sealing surface engagable by the peripheral sealing surface of said valving member.

19. In a valve seal comprising in combination, a valve body defining an axial flow passageway, a valve member pivotally mounted in the valve body to selectively block and unblock the passageway, the valve member having a peripheral sealing surface, annular groove means in the valve body communicating with the passageway and disposed in radial alignment with the peripheral sealing surface of the closure member when it is positioned to block the passageway, said groove means having a radially inner portion substantially wider than the radially outer portion thereof, a resilient sealing ring disposed in groove means and projecting radially inwardly therefrom into the passageway with a primary sealing surface formed on the inner periphery thereof engageable by a peripheral sealing surface of the closure member when it is positioned to block the passageway, said sealing ring forming axially extending shoulder means and a circumferential web extending substantially radially outwardly from said axially extending shoulder means and into the radially outer portion of said groove means said peripheral sealing surface of said closure member being in the form of a circular sector in axial cross-section with the radius of said sector decreasing from the axial center of said sealing surface to the edges thereof so as to privide a non-interfering lead in to said primary sealing surface on the inner periphery of said sealing ring, and metal hoop means located on and engaging at least a portion of said shoulder means, said hoop means and sealing ring being dimensioned relative to each other and relative to the closure member so as to be circumferentially stretched when the primary sealing surface of the sealing ring is substantially completely engaged by the peripheral sealing surface of the closure member and such that said hoop means returns said sealing ring to a substantially unstretched condition when the primary sealing surface thereof is not substantially completely engaged by the peripheral sealing surface of the closure member, the improvement comprising:

a second flexible sealing ring, also disposed in said groove means and projecting radially inwardly therefrom into said passageway, having a cross-sectional configuration including a curvilinear S-shaped cross-sectional portion and an extension from said S-shaped cross-section, said extension retained within said groove means so as to provide cantilever means for said second flexible sealing ring.

* * * * *

UNITED STATES PATENT AND TRADEMARK OFFICE
CERTIFICATE OF CORRECTION

PATENT NO. : 4,487,216
DATED : December 11, 1984
INVENTOR(S) : James E. Barker et al.

It is certified that error appears in the above-identified patent and that said Letters Patent is hereby corrected as shown below:

In the Abstract, line 9, delete "1000" and insert --1600--.

Column 2, line 9, delete "centilever" and insert --cantilever--.

line 44, after "5" insert --is--.

line 46, delete "plan" and insert --front--.

line 58, delete "firesafe" and insert --fire safe--.

Column 3, line 5, delete "a" and insert --and--.

line 7, delete "firesafe" and insert --fire safe--.

Column 4, line 31, delete "trough" and insert --through--.

Claim 6, line 7, delete "1000" and insert --1600--.

Claim 10, line 7, delete "firesafe" and insert --fire safe--.

line 11, delete "firesafe" and insert --fire safe--.

Signed and Sealed this

Sixth Day of August 1985

[SEAL]

Attest:

DONALD J. QUIGG

*Attesting Officer*     *Acting Commissioner of Patents and Trademarks*